United States Patent
Kostecki et al.

[19]

[11] Patent Number: 6,118,572
[45] Date of Patent: Sep. 12, 2000

[54] PHOTOCHROMIC, ELECTROCHROMIC, PHOTOELECTROCHROMIC AND PHOTOVOLTAIC DEVICES

[75] Inventors: Robert Kostecki, Lafayette; Frank R. McLarnon, Orinda, both of Calif.

[73] Assignee: The Regents of the University of California, Oakland, Calif.

[21] Appl. No.: 09/346,121

[22] Filed: Jul. 1, 1999

Related U.S. Application Data

[60] Provisional application No. 60/091,355, Jul. 1, 1998.
[51] Int. Cl.$^7$ ........................................................ G02F 1/15
[52] U.S. Cl. .......................... 359/265; 359/270; 359/275; 345/105
[58] Field of Search ..................... 359/265, 266, 359/267, 270, 275; 345/105, 179

[56] References Cited

U.S. PATENT DOCUMENTS

| | | | |
|---|---|---|---|
| 4,599,614 | 7/1986 | DeBerry et al. | 345/105 |
| 5,307,201 | 4/1994 | Passerini et al. | 359/270 |
| 5,604,626 | 2/1997 | Teowee et al. | 359/265 |
| 5,805,330 | 9/1998 | Byker et al. | 359/265 |

*Primary Examiner*—Loha Ben
*Attorney, Agent, or Firm*—Henry P. Sartorio

[57] ABSTRACT

A light activated photoelectrochromic device is formed of a two-component system formed of a photoactive charge carrier generating material and electrochromic material (plus an elecrolyte). Light interacts with a semiconductive material to generate hole-electron charge carriers which cause a redox reaction in the electrochromic material. One device is formed of hydrated nickel oxide as the electrochromic layer and polycrystalline titanium dioxide as the charge generating material. The materials may be formed as discrete layers or mixed together. Because of the direct charge transfer between the layers, a circuit to apply a voltage to drive the electrochromic reaction is not required, although one can be used to enhance the reaction. The hydrated nickel oxide-titanium dioxide materials can also be used to form a photovoltaic device for generating electricity.

12 Claims, 9 Drawing Sheets

PHOTOCHROMIC, ELECTROCHROMIC, PHOTOELECTROCHROMIC AND PHOTOVOLTAIC DEVICES

RELATED APPLICATIONS

This application claims priority from provisional application Ser. No. 60/091,355 filed Jul. 1, 1998.

REFERENCE TO GOVERNMENT INTEREST

This invention was made in the course of contract DE-AC03-76SF0098 between the United States Department of Energy and the University of California for the operation of Lawrence Berkeley Laboratory. The United States Government has certain rights to this invention.

BACKGROUND OF THE INVENTION

1. Field of the Invention

The invention relates to photochromic, electrochromic, photoelectrochromic and photovoltaic devices. As used herein, photochromic generally refers to a change in color from light absorption, electrochromic refers to an electrically induced change in color, photoelectrochromic refers to a change in color produced by photogenerated charge carriers and photovoltaic refers to generating a voltage by light absorption.

2. Background Art and Related Disclosures

Both photochromic materials which change color upon absorption of light, and electrochromic materials which change color in response to an electrically induced change in oxidation state, have shown great promise for future, so called "smart" windows and information display applications. Both of these classes of optically reversible switching materials offer dynamic control of visible light levels and solar radiation with long memory times, and thus the ability to control illumination levels as well as glare, heat gain and heat loss.

This ability to control the transfer of heat, cold and light through glass has a very high utility, energy saving and commercial potential and, therefore, the availability of materials possessing a combination of these properties and having these qualities would be very valuable. However, until now, materials having both of these properties, that is materials which change color upon absorption of light and also in response to an electrically induced change in oxidation state, are not in any practical sense available.

Although there are many metal oxides, polymers and other materials which exhibit some or all of those properties, and in spite of a large number of studies on these materials in many configurations, there still remain fundamental problems that have prevented a large-scale fabrication and commercialization of photochromic and electrochromic devices. These problems include inadequate reversibility, lack of long-term stability and high costs of fabrication.

A traditional electrochromic device usually consists of a number of sequentially deposited layers, including the active electrode, electrolyte, ion-storage layer and counter electrode (or the electrochromic materials may be dispersed in a solid or semi-solid electrolyte). These layers must be deposited on a conducting substrate. In these instances, the oxidation state of the active material and consequently the color of the device is controlled by the potential between the active electrode and counter electrode.

A self-powered "smart" electrochromic window which could control its own transparency is described in Nature, 383:608 (1996). This system combined two separate electrodes: a dye-sensitized semiconductor $TiO_2$ photoelectrode and a $WO_3$ electrochromic electrode. The electrochromic effect of this composite system is ascribed entirely to the transfer of photogenerated charge between the electrodes through an external circuit. The $TiO_2$ electrode drives the $WO_3$ electrode to change from transparent to dark blue ($Li_xWO_3$) under illumination. The electrons travel between the electrodes through an external circuit and the resulting negative charge is compensated by positively charged lithium ions from an electrolyte phase, which intercalate into the layered $WO_3$ structure. This structure is similar to the traditional electrochromic device. However, the system is complicated and unstable.

A photoelectrochromic effect in $WO_3$ colloids with steady-state UV photolysis in the presence of oxalic acid as a hole scavenger was described in J. Phys. Chem., 97:11064 (1993). The photoelectrochromic characteristics of thin Prussian blue (PB) on both single crystal and polycrystalline $TiO_2$ electrodes was described in J. Electrochem. Soc., 130:249 (1983). It was found that illumination of the composite electrode led to the oxidation of the colorless Prussian white (PW) film to Prussian blue at potentials at least 500 mV lower than the PW/PB redox potential for a modified Pt electrode.

However, none of these described devices and structures have been advantageously utilized for fabrication of a useful device as they are typically costly, laborious to fabricate and lack the properties required for wide use and distribution.

U.S. Pat. No. 4,599,614 issued Jul. 8, 1986 to DeBerry et al. for Photoelectrochromic Display and U.S. Pat. No. 5,604,626 issued Feb. 18, 1997 to Teowee et al. for Photochromic Devices are illustrative of the prior art.

All patents, patent applications, published articles and abstracts referred to in the specification are hereby incorporated by reference in their entirety.

SUMMARY OF THE INVENTION

One aspect of the present invention concerns a photoelectrochromic device wherein the light-absorption process produces charge carriers in a photoactive layer and the coloration process occurs through a redox reaction in a separate electrochromic layer.

A second aspect of the present invention concerns a photoelectrochromic device wherein the light-absorption process produces charge carriers in a photoactive material and the coloration process occurs through a redox reaction in a separate electrochromic material, where the two materials are mixed in a single layer.

Another aspect of the present invention concerns a photoelectrochromic device comprised of a photoactive/electrochromic system made of a hydrated nickel oxide layer deposited on a polycrystalline titanium dioxide layer or where the two materials are mixed in a single layer.

Still another aspect of the present invention concerns a photoelectrochromic device of changeable transmissivity, said device not requiring an external voltage source to change transmissivity, said device comprising a photoactive/electrochromic system (with an electrolyte).

Yet another aspect of the present invention is a process for fabrication of a low cost photoelectrochromic device comprising a photoactive/electrochromic system and for fabrication of articles of manufacture, such as window panels, roof coverings, car windshields, lenses, display cases, cold and refrigeration counters, and optical switches for telecommunication.

Another aspect of the present invention concerns a photovoltaic device comprised of a hydrated nickel oxide layer deposited on a polycrystalline titanium dioxide layer.

The invention is a light activated photoelectrochromic device comprising a photoactive and electrochromic system including a charge generating semiconductor material in which light is absorbed to produce hole and electron charge carriers, and an electrochromic material in which the charge carriers produce a redox reaction which changes the color of the material. An electrolyte material is also included for ionic charge transfer. The device may be formed of discrete layers of the materials, or the materials may also be mixed in a single layer. No control circuit needs to be connected to the system, although a voltage below the redox potential of the electrochromic material may be applied to increase the rate of color change. In particular, the invention includes a device comprising at least one layer of active hydrated nickel oxide deposited on a second layer of polycrystalline titanium dioxide. These materials may also be used to form a photovoltaic device.

DETAILED DESCRIPTION OF THE INVENTION

Figure 1A:
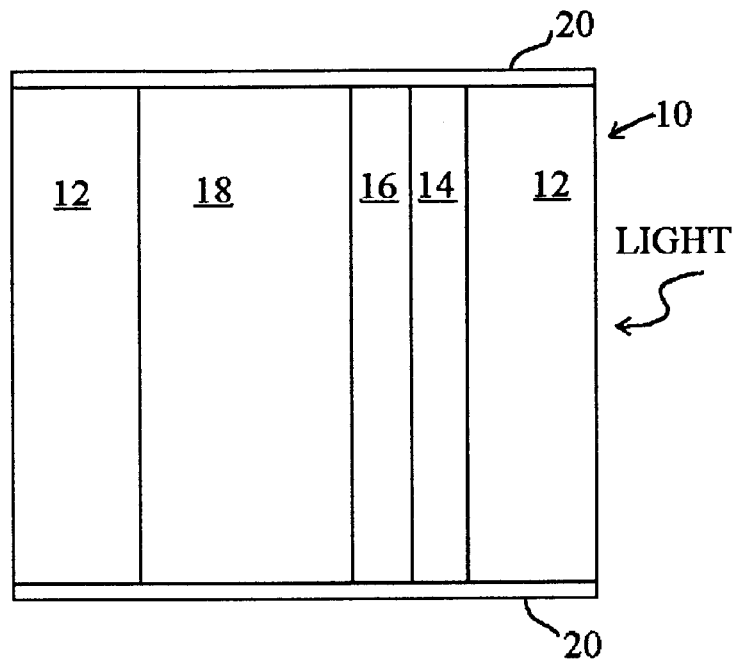
FIGS. 1 A, B are cross-sectional views of discrete layer photoelectrochromic devices according to the invention, without and with a control circuit.
FIGS. 1C, D are cross-sectional views of single layer photoelectrochromic devices according to the invention, without and with a control circuit.
FIG. 1E is a cross-sectional view of a photovoltaic device according to the invention.

This invention relates to light actuated photoelectrochromic devices which do not require an external electrical source to change the transmittance but instead utilize the energy of the incident light to modify their own transmissivity.

In the broadest terms, the photoelectrochromic device comprises any substrate (typically a translucent material), a photoactive semiconductive material, an electrochromic material, and an electrolyte. The semiconductive material, electrochromic material, and electrolyte may be discrete layers, or may be mixed in one layer. Conductive layers can be included to apply a control source.

The device exhibits photoelectrochromism wherein the light-absorption process takes place in the photoactive semiconductor material to produce charge carriers, and the charge carriers produce a redox reaction in the electrochromic material. These properties are attributable to a two-component photoactive and electrochromic system consisting of a light absorbing charge generating material, such as titanium dioxide, on which is deposited, or which is mixed with, an electrochromic material, such as hydrated nickel oxide. An electrolyte is also included, as another layer or mixed with the other materials. The combination of materials or layers is deposited on any substrate, e.g. glass. The devices possess a changeable transmissivity not requiring an external source to change such transmissivity. However, an external source may also be added to provide an electrochromic override.

The present invention also includes a process for fabrication of a photoelectrochromic device and for fabrication of articles of manufacture, such as window panels, roof coverings, car windshields, lenses, display cases, cold and refrigeration counters, and optical switches for telecommunication, and a method of use of these articles of manufacture, for example, for installations of windows or glass doors in buildings and houses, for heat conservation, for air conditioning purposes and for energy consumption savings, for building and illumination materials, for prevention of sun and light glare, for light-responsive lenses in glasses and sunglasses, for installation in display cases in museums and libraries to preserve rare documents and paintings from sun or light damage, for installation in cold and refrigeration counters for food preservation, and for optical switching in telecommunication systems. All these and other uses not specifically mentioned above are intended to be within the scope of this invention.

The present invention provides an improvement and an alternative route to existing photochromic or electrochromic devices.

Specifically, the invention is a two-component system (three-component if the electrolyte is counted), consisting of a hydrated nickel oxide layer deposited on a polycrystalline titanium dioxide layer, or a mixed $Ni(OH)_2$/$TiO_2$ layer. The resulting structure exhibits photoelectrochromism, without an electrical control circuit. The charge carriers generated by one of the two components ($TiO_2$) drives the electrochromic reaction of the other component ($Ni(OH)_2$).

The two-component system allows individual optimization and/or modification of the photoelectrochromic properties of the photoelectrochromic materials. Moreover, while the coloration process in conventional devices requires an external electrical current to flow between two electrodes, the present device exhibits photoelectrochromism at open circuit due to the direct charge transfer between the semiconductor and electrochromic materials, and therefore does not require a conducting substrate or an external circuit.

The ability to operate without external electrical current not only greatly expands the range of materials which could be used as a substrate for the composite layer, but also substantially reduces the manufactured cost of the device. The composite system of the invention can also be applied in the conventional two-electrode electrochromic configuration and thereby allow the user to control the rate and extent of the coloration/bleaching process by imposing an external potential between the electrodes.

Moreover, as the coloration process in the present device occurs only on the specific areas which are exposed to light, non-uniform illumination produces a patterned optical state of the device, which can be stored or erased when necessary. This device therefore has optical read-write capability.

A photoelectrochromic device based on the direct contact between a semiconducting photosensitive material and an electrochromic material is potentially important in the development of electrochromic and optical devices.

I. Photoelectrochromic Device

The photoelectrochromic device of the invention is based on performing the light-absorbing function in a semiconductor material that produces photogenerated pairs of charge carriers, i.e. holes in the valence band and electrons in the conduction band, and placing the semiconductor electrode in direct contact with an electrochromic material, which acts as an effective hole or electron scavenger, depending on the type of semiconductor and the equilibrium potential of the electrochromic redox couple.

The photogenerated charge carriers in the semiconductor material are then directly transferred and consumed by the redox reaction in the electrochromic material, which thereby changes its oxidation state, and consequently changes its color as a result of absorption of light by the semiconductor. The photogenerated charge carriers of opposing polarity either accumulate in the semiconductor or are consumed by another redox reaction, which then proceeds either in the bulk of the semiconductor material or on the surface of a counter electrode, if conductive electrodes are included. Another material, e.g. a stabilizer, may be included in the semiconductor to produce this other redox reaction.

Titanium dioxide, which is a particularly stable semiconductor, was selected to design and construct a functional photochromic device. $TiO_2$ films were deposited on transparent conductive glass substrates.

When the transparent $Ni(OH)_2$ films were electrochemically deposited onto the $TiO_2$ layers formed on conductive glass, the composite optically transparent electrode exhibited strong reversible photochromic and photoelectrochromic properties when illuminated by a 75 W Xe lamp at open circuit and at anodic polarization in 1.0 M aqueous NaOH.

The intensity of the electrode darkening depended on the intensity of the UV light, exposure time and/or any applied potential. Electrochemical and optical absorption measurements showed that the black coloration of this composite electrode occurs when the UV photogenerated holes in the $TiO_2$ valence band recombine with the electrons from the electrochromic layer of $Ni(OH)_2$, thereby oxidizing it to NiOOH. The darkening process occurred only on the specific areas which were exposed to light, and consequently non-uniform illumination allows production of a patterned optical state of the device.

Figure 1B:
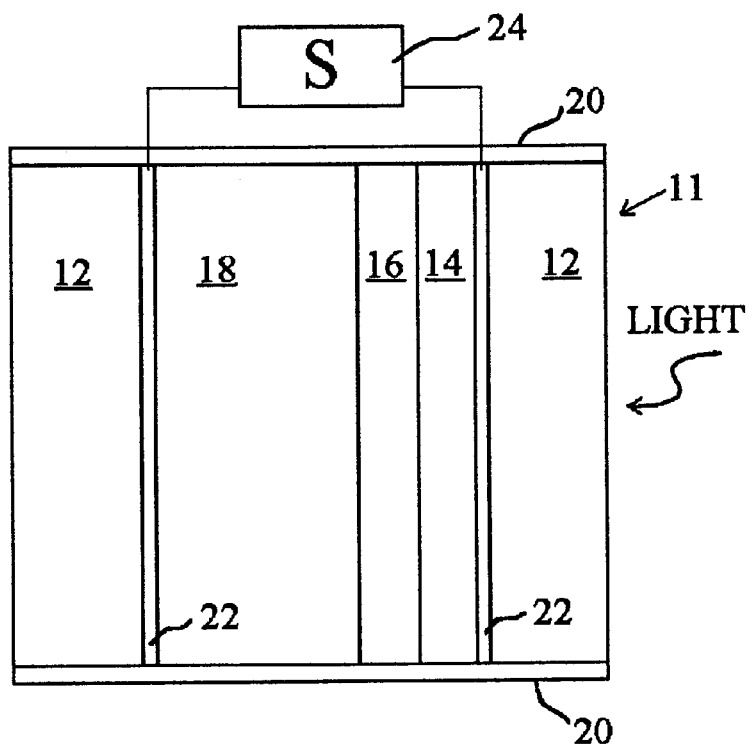
Figure 1C:
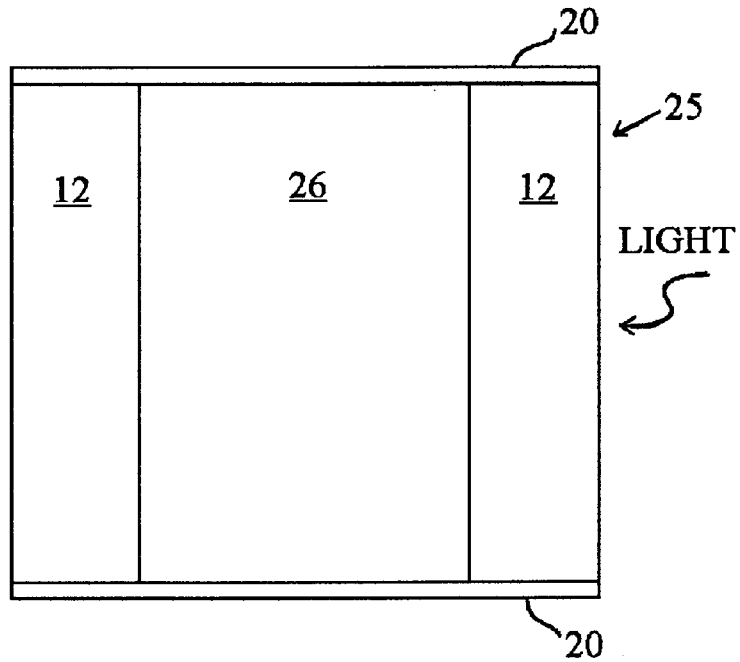
Figure 1D:
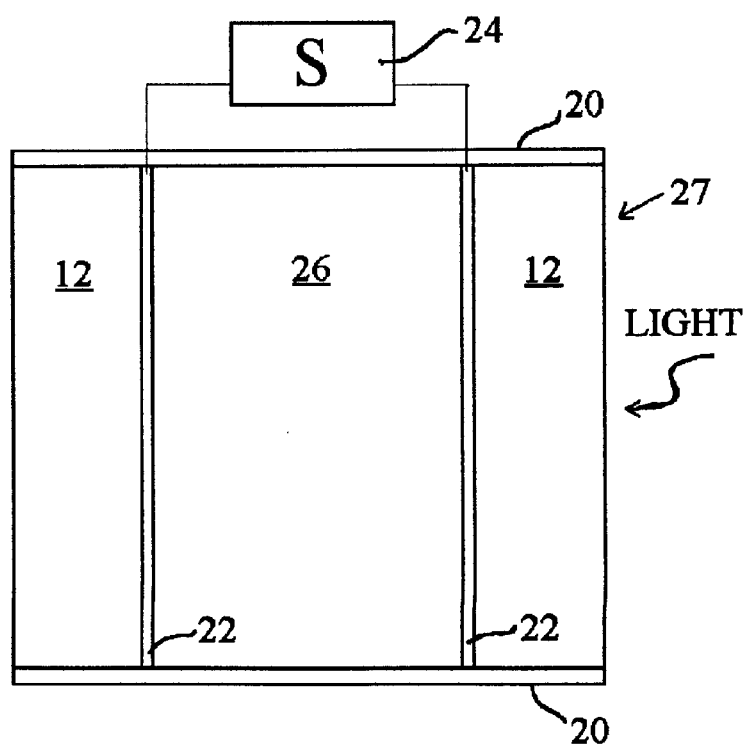

FIG. 1A is a cross-sectional view of a light actuated photoelectrochromic device 10 of the invention. Device 10 comprises a pair of substrates 12, e.g. translucent material. Semiconductive layer (or electrode) 14 is formed on one of the substrates 12, and electrochromic layer 16 is formed on semiconductor layer 14. An electrolyte layer 18 is positioned adjacent to electrochromic layer 16, with the other substrate 12 on the other side. All of the structure is contained within enclosure 20. As described further below, FIG. 1B shows an alternate photoelectrochromic arrangement or device 11 with an electrochromic override. An external electrical source (S) 24 is connected to conductive layers 22 which are formed on the surfaces of substrates 12 and act as contact electrodes to apply a voltage across the layers 14, 16, 18. As also described below, FIGS. 1C,1D show alternate embodiments or devices 25, 27 which correspond to devices 10, 11 respectively but in which the discrete layers 14, 16, 18 are replaced by a single mixed layer 26 which includes the photoactive material, the electrochromic material, and the electrolyte. For illustrative purposes, the thicknesses of the layers are greatly exaggerated.

While individual components of the device are also generally termed electrodes, e.g. layers 14 or 22, the device of FIG. 1A as an entity is referred to as a single electrode while the device of FIG. 1B as an entity is referred to as a two electrode system since it includes a counter electrode for applying a voltage across the device.

The photoelectrochromic device exists in two functionally different states—a state of coloration and a state of reverse coloration, i.e. return to the precoloration (bleached) state. The first state is achieved by illumination of the two-component system whereby the illuminated portion of the device colors. The second state is achieved by bleaching, i.e. by removing the illumination source, or may be attained by protecting the part or the whole device from the illumination where the unexposed part remains in the bleached state.

Illumination of the laminated structure of $TiO_2$ and hydrated nickel oxide layers led to a gray-black coloration of the light-exposed area of the electrochromic material, even when the electrode was held at open circuit. The coloration process occurred within ~10 minutes, and the color intensity was a function of light intensity and light-exposure time. The unexposed part of the electrode remained in its bleached state whereas the illuminated part became colored. The pattern was very sharp and exhibited very good lateral resolution.

At open circuit without illumination, i.e. under dark laboratory conditions, the potential of the electrode varied between −0.2 and −0.4 V. Light absorption by the semiconductor material resulted in a dramatic and unusual negative shift of the electrode potential to between −0.8 and −0.9 V, as seen in FIG. 2.

Figure 2:
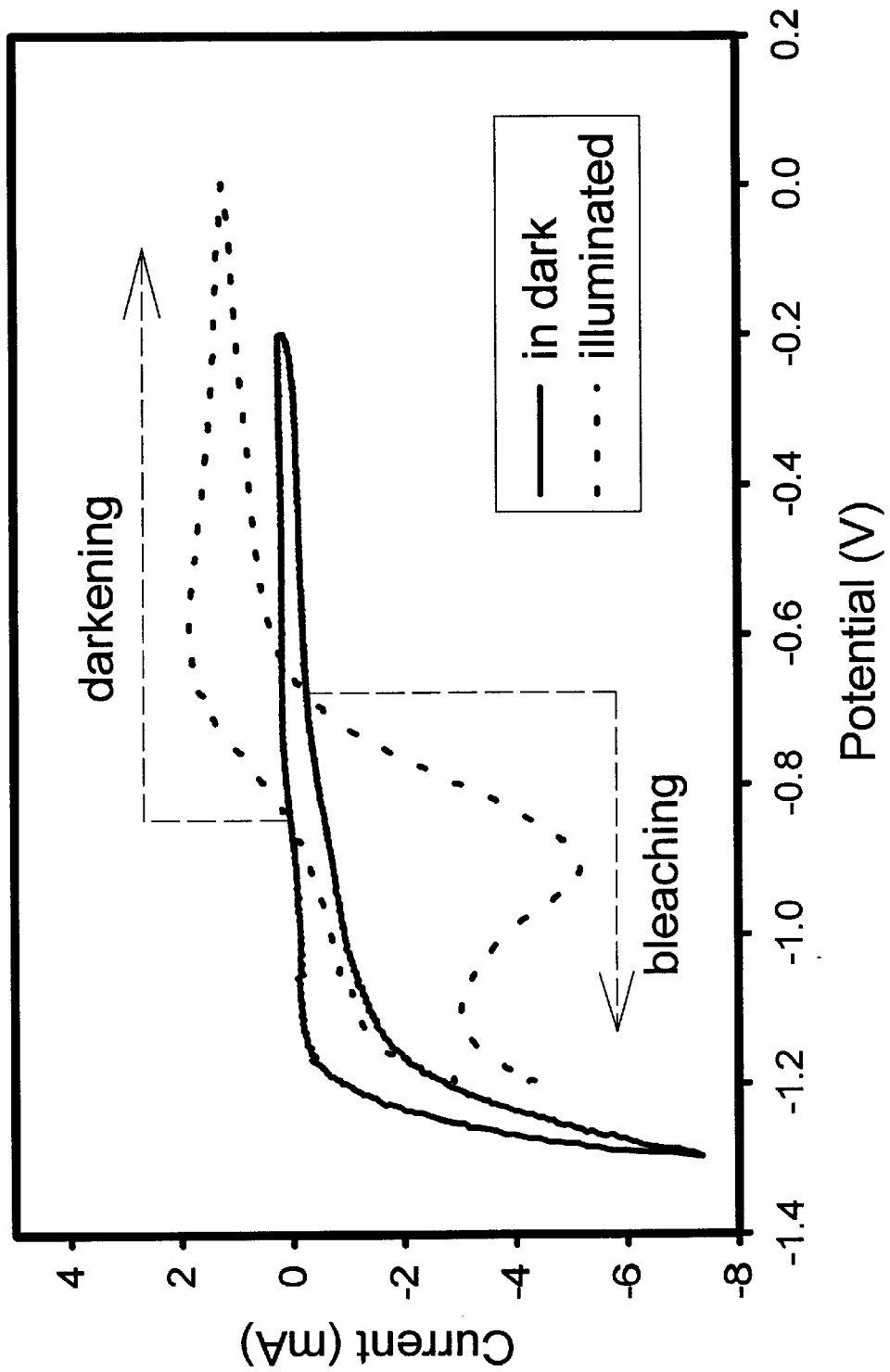
FIG. 2 shows a cyclic voltammogram of the glass/$SnO_2$/$TiO_2$/$Ni(OH)_2$ electrode.

FIG. 2 presents a cyclic voltammogram of the glass/$SnO_2$/$TiO_2$/$Ni(OH)_2$ electrode in 1.0 M NaOH electrolyte, with and without illumination. The voltage sweep rate was 50 mV/s.

When the light was blocked after the hydrated nickel oxide was oxidized, the electrode potential returned slowly back to its initial value, i.e. between −0.3 and −0.4 V, accompanied by a spontaneous return of the nickel oxide electrode to its original bleached state. Recovery to the bleached state after the light was blocked was somewhat slower than the coloration process.

II. Properties of the Photoelectrochromic Device

Photoelectrochromic properties of the two-component device of the invention were tested and cyclic voltammograms (FIGS. 3 and 4), absorption changes (FIGS. 5 and 6), and ex-situ absorption transmittance spectra (FIG. 7) were recorded.

Figure 3:
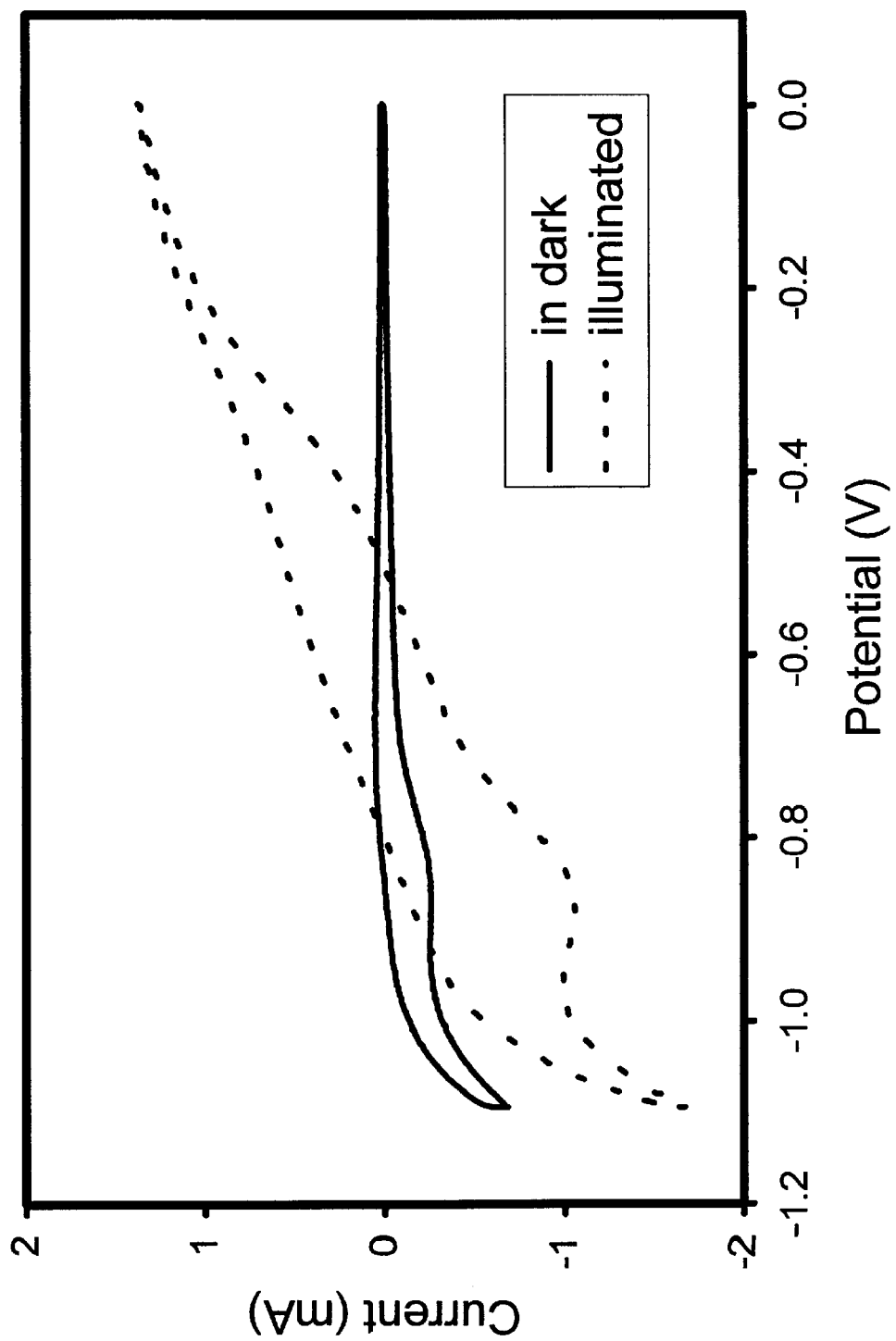
FIG. 3 shows cyclic voltammograms of the Ti/$TiO_2$ electrode recorded in argon saturated 1 M aqueous NaOH solution in the dark and under near-UV illumination.

FIG. 3 shows cyclic voltammograms of the Ti/$TiO_2$ electrode recorded in Ar-saturated 1 M aqueous NaOH solution in the dark and under near UV illumination. Scans were performed at 50 mV/s.

As seen in FIG. 3, both curves exhibit behavior characteristic of n-type semiconductor electrodes. The slight cathodic current on the polycrystalline $TiO_2$ electrode in the dark corresponds to the water reduction reaction and/or the surface reduction of $TiO_2$, which may be formulated as

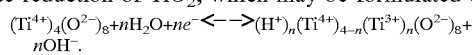
$(Ti^{4+})_4(O^{2-})_8 + nH_2O + ne^- \longleftrightarrow (H^+)_n(Ti^{4+})_{4-n}(Ti^{3+})_n(O^{2-})_8 + nOH^-$.

Illumination of the $TiO_2$ electrode led to a rise of anodic photocurrent at potentials above −0.8 V due to the photooxidation of water. Photogenerated peroxo species present at the surface of $TiO_2$ particles and also dissolved in the solution undergo cathodic reduction at potentials more negative than −0.5 V during cathodic scan.

Figure 4:
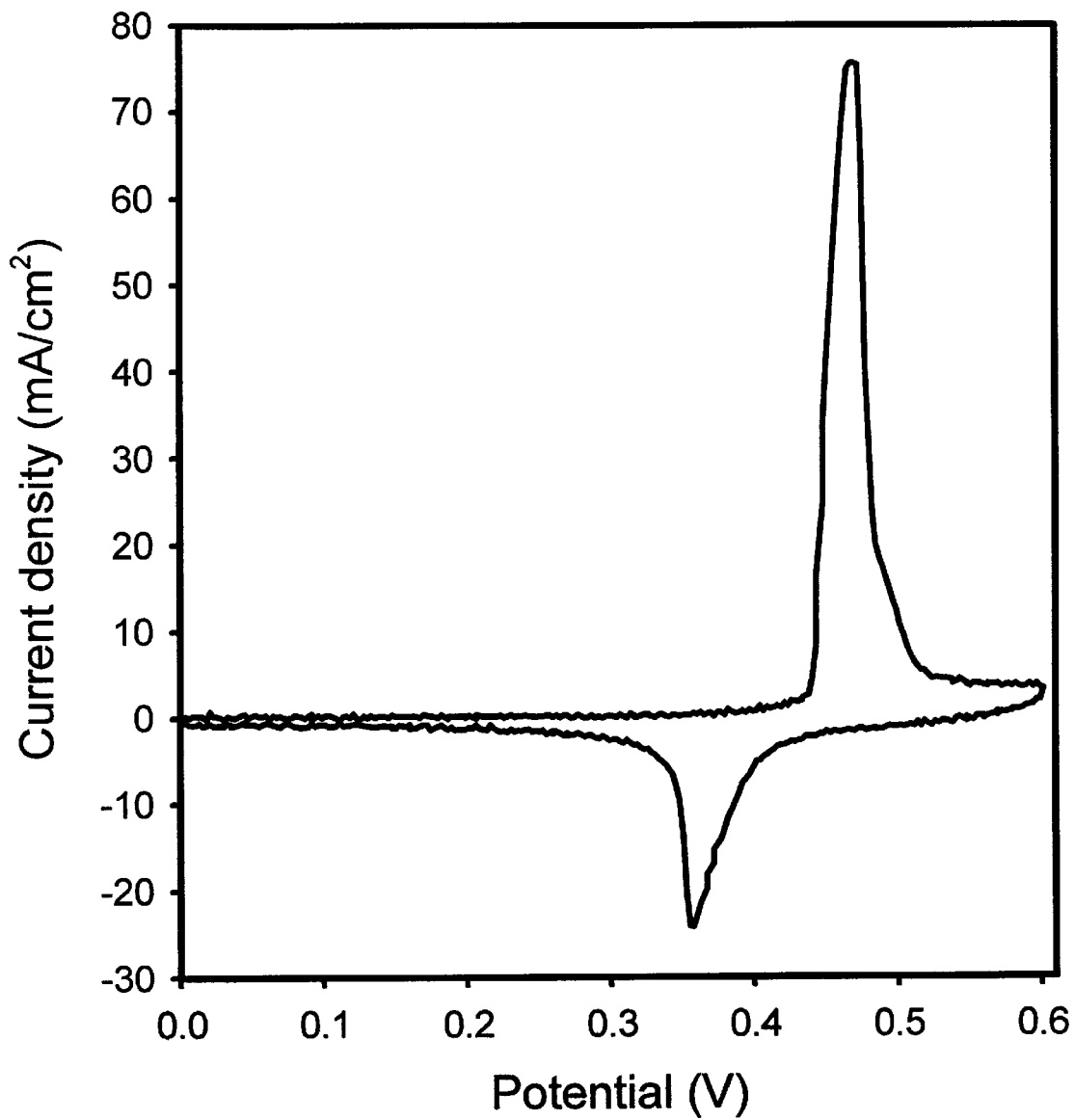
FIG. 4 is a cyclic voltammogram of 286 mC/cm$^2$ of $Ni(OH)_2$ electroprecipitated onto a glass/ITO substrate in 1 M NaOH solution.

FIG. 4 is a cyclic voltammogram of a freshly electroprecipitated $Ni(OH)_2$ electrode on an ITO glass substrate carried out in 1 M aqueous NaOH. The redox couple located at ~0.41 V is associated with the reaction $$Ni(OH)_2 + OH^- \longleftrightarrow NiOOH + H_2O + e^-.$$

The oxidation peak at 0.46 V and the reduction peak at 0.36 V correspond to the darkening and bleaching process, respectively. The visible spectral characteristic of $Ni(OH)_2$ films depends on the film thickness and film preparation method; however, in the reduced state they do not exhibit significant absorption bands in the visible range. This property renders them nearly transparent in the reduced state, whereas the spectra of the black NiOOH films show strong and broad absorption in the 300 to 700 nm range.

Illumination of the laminate $TiO_2$—$Ni(OH)_2$ structure led to a gray-black appearance of the light-exposed area of the electrochromic material, even when the electrode was held at open circuit. The unexposed part of the electrode remained in its bleached state whereas the illuminated part became dark. At open circuit without illumination, the potential of the electrode varied between −0.2 and −0.4 V. Light absorption by the electrode material resulted in a substantial negative shift of the electrode potential to −0.8 to −0.9 V.

In order to evaluate the electrochromic behavior of the composite $TiO_2/Ni(OH)_2$ electrode, in-situ absorption measurements were carried out during the irradiation and/or electrochemical operation of the electrode.

Figure 5:
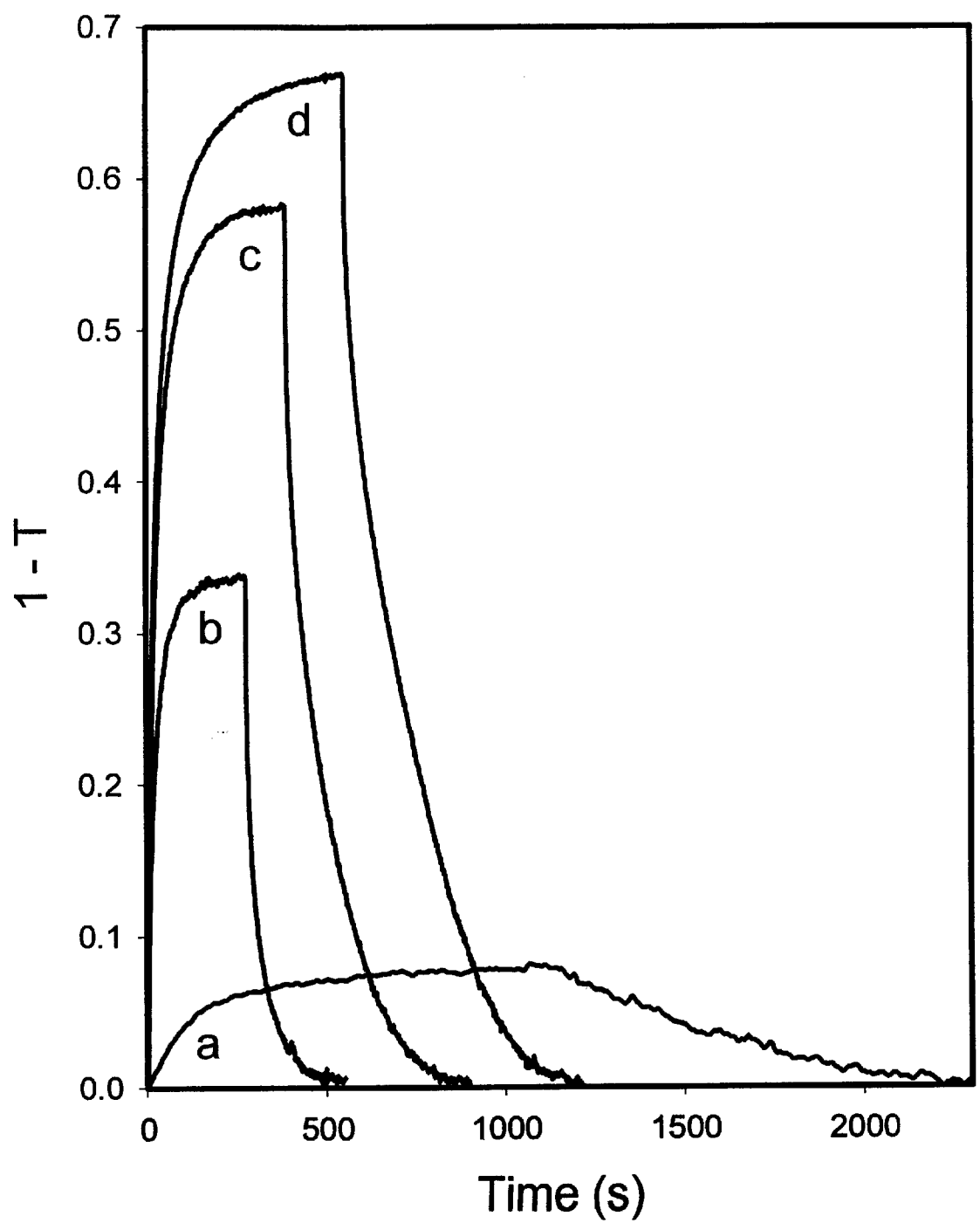
FIG. 5 is a graph showing the difference between integrated optical transmittance at 515<λ<552 nm of an ITO/$TiO_2$/$Ni(OH)_2$ electrode measured as a function of UV irradiation/bleaching time and applied potential in 1 M NaOH solution.

FIG. 5 shows absorption change in the spectral area between 515 and 552 nm versus time of irradiation/bleaching. The difference of integrated optical absorption at $515<\lambda<552$ nm of an $ITO/TiO_2Ni(OH)_2$ electrode was measured as a function of UV irradiation/bleaching time and applied potential in 1 M NaOH solution. The electrode was irradiated at open circuit potential (curve A) for 1053 seconds. Then the UV light was blocked.

The curves B, C, D correspond to the electrodes irradiated at −0.5, −0.3 and 0.0 V for 276, 389, and 550 seconds, respectively, when the UV light was blocked and the potential was stepped to −1.1 V.

The absorption change seen in FIG. 5 corresponds to the black coloration of the electrode. The darkening process at open circuit potential (curve A) started immediately upon irradiation and its intensity was a direct function of light intensity and light-exposure time. After 18 minutes exposure the absorbance (515–552 nm) increased by 8%. When a UV filter ($\lambda<500$ nm) was interposed, the absorbance returned slowly back to its original bleached state, thus demonstrating the origin of the photoeffect in $TiO_2$ band-gap excitation. Bleaching was accompanied by a spontaneous return of the electrode potential to its initial value in the bleached state, i.e., between −0.3 and −0.4 V. Recovery to the reduced state after the UV light was blocked was somewhat slower than the darkening process. The effect was clearly reversible under these conditions and could be repeated indefinitely.

The reversible photochromism observed in the $TiO_2/Ni(OH)_2$ electrode at open circuit potential was further investigated by recording the absorption changes vs. time at applied potentials between −1.1 and 0.0 V. Both cathodic and anodic electrode polarization have a substantial effect on the darkening/bleaching rate.

The changes in the absorbance recorded during irradiation attained 33, 58, and 67% at −0.5 V (curve B), −0.3 V (curve C), and 0.0 V (curve D), respectively. The time required to complete the darkening process extended from 280 seconds at −0.5 V to 550 seconds at 0.0 V. Cathodic polarization at −1.1 V drove the electrode back to its bleached state no matter whether the UV light was turned on or off. The time of bleaching at −1.1 V was nearly identical to the time of coloration at each of the anodic potentials.

Figure 6:
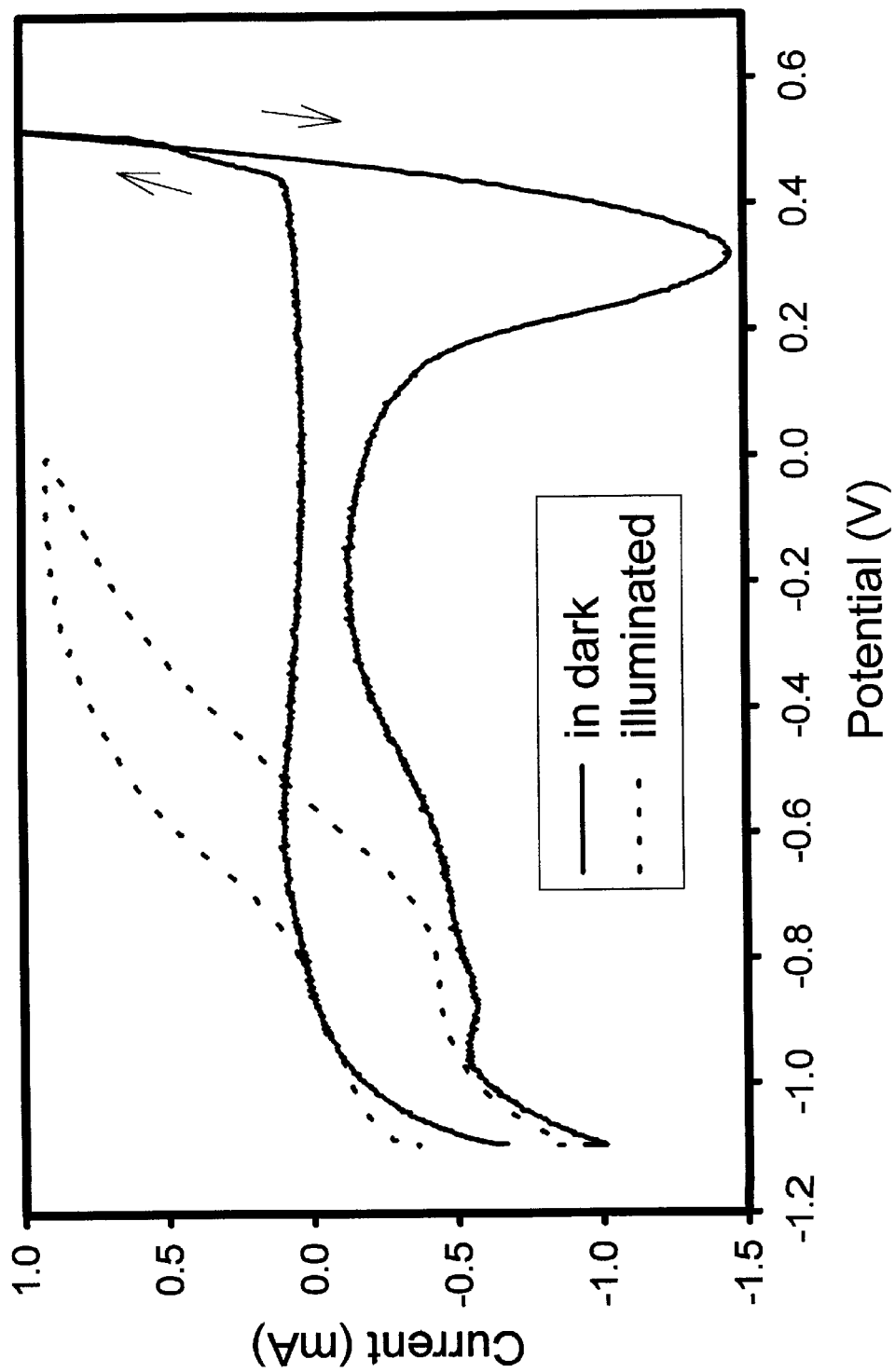
FIG. 6 shows cyclic voltammograms of the ITO/$TiO_2$/$Ni(OH)_2$ electrode in 1 M NaOH electrolyte with and without illumination.

Cyclic voltammetry results for a thin film $ITO/TiO_2/Ni(OH)_2$ electrode in 1 M NaOH electrolyte, with and without illumination, are seen in FIG. 6. The potential sweep rate was 50 mV/s.

As seen in FIG. 6, in the dark, no oxidation reaction was observed unless the anodic scan potential limit was extended beyond the potential of $Ni^{2+}$ to $Ni^{3+}$ oxidation. At potentials higher than 0.43 V, a direct electrochemical oxidation of the electrochromic $Ni(OH)_2$ layer occurs accompanied by the darkening of the entire surface of the electrode. The scan shown in FIG. 6 was extended to 0.65 V; however, the large anodic current is not shown for the clarity of presentation. On the reverse scan, the reduction peak at 0.32 V was followed by a large cathodic plateau at about −0.7 V. The charge of the reduction process was significantly lower than that of the anodic process. Consistent with this, the black color of the oxidized film remained when the potential was swept back to −1.2 V. The film returned to its initial transparent state after 5 minutes of cathodic polarization at the −1.2 V potential. The voltammogram of the irradiated composite thin film electrode does show significant difference in the shape compared to the single-layer $TiO_2$ electrode, which suggests the occurrence of different photogenerated species. The darkening of the electrode and the shift of the cathodic peak toward higher potentials confirm this finding.

Figure 7:
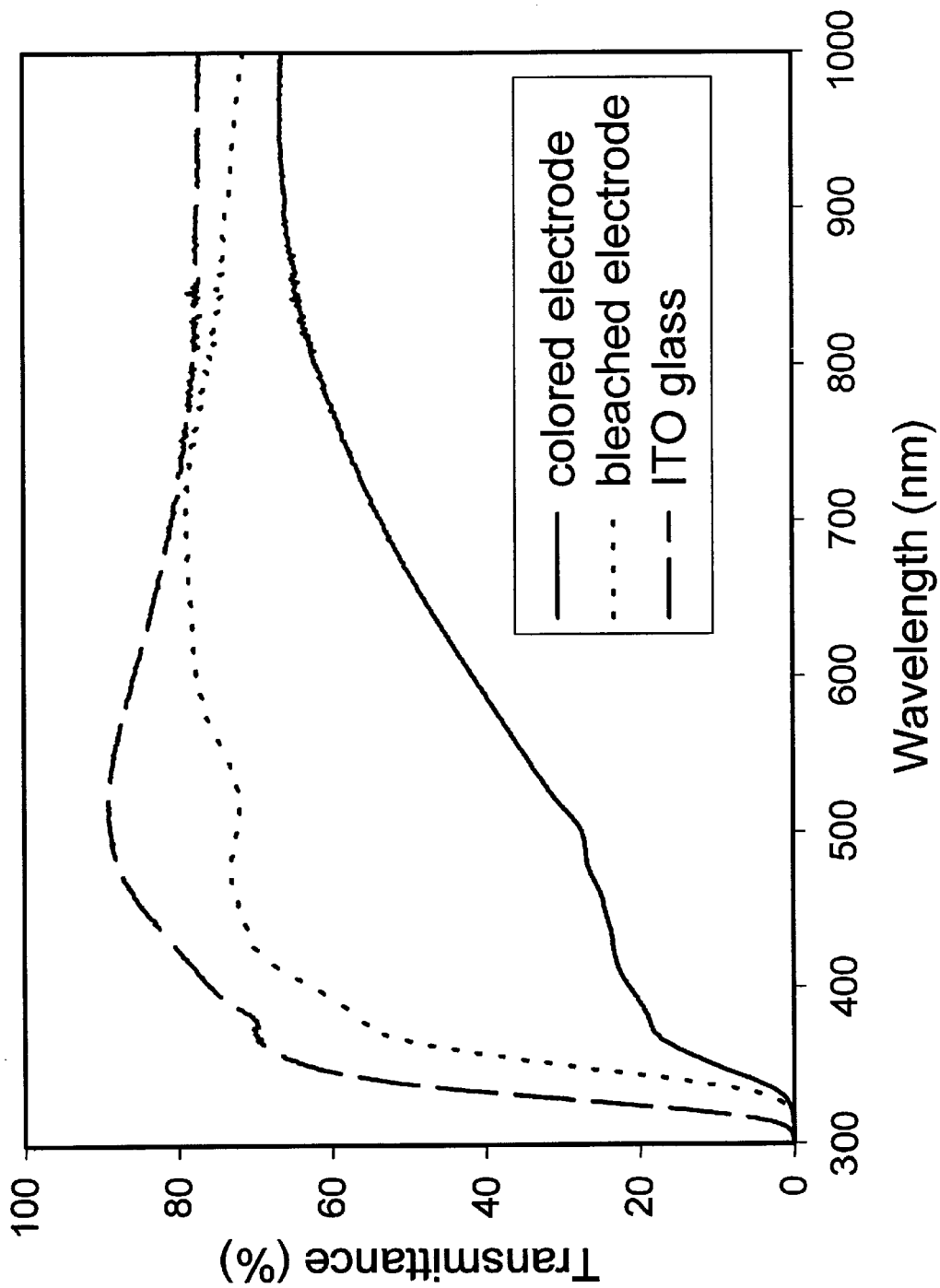
FIG. 7 shows the ex-situ transmittance spectra of bare ITO glass, an ITO/$TiO_2$/$Ni(OH)_2$ electrode UV-irradiated in 1.0 M NaOH for 5 minutes, and a bleached electrode.

In order to characterize the electrochromic behavior of the $ITO/TiO_2/Ni(OH)_2$ electrode qualitatively, the ex-situ absorption spectra of the darkened and bleached electrode were recorded, as seen in FIG. 7.

FIG. 7 shows ex-situ transmittance spectra of bare ITO glass (dashed curve), an $ITO/TiO_2/Ni(OH)_2$ electrode UV irradiated in 1 M NaOH for 5 minutes (solid curve), and a bleached electrode after electrochemical reduction in 1 M NaOH solution at −1.1 V for 5 minutes (dotted curve). The electrode was irradiated at 0.0 V in 1 M NaOH for 5 minutes, removed from the cell, rinsed with distilled water, dried in a stream of $N_2$ and then placed in the spectrometer. After the spectrum was recorded, the electrode was returned to the cell and was polarized cathodically at −1.1 V for 5 minutes. The same procedure was then repeated to record another spectrum. Since the black coloration of the electrode typically persisted for two days in air, the changes which occurred during the electrode preparation and spectrum measurement were considered negligible.

The strong absorption band was shown to be responsible for the gray-black color of the sample and was assigned to charge transfer from high-valency nickel sites to oxygen. In contrast, the visible spectra of $Ni(OH)_2$ films in the reduced state show no significant absorption bands. The spectrum of the reduced electrode therefore corresponds to an intermediate stage of charge of the $Ni(OH)_2$ layer and indicates that the film was not fully reduced. Both spectra exhibit a strong absorption band in the UV region which extends to 420 nm and has been assigned to the band gap absorption of $TiO_2$. The shape of the band at short wavelengths<350 nm may be somewhat distorted by the baseline correction process.

III. Mechanism of the Photoelectrochromic Process

The photoelectrochromic process of the invention is based on the following mechanism. Illumination of the composite TiO$_2$/Ni(OH)$_2$ electrode leads to direct electron transfer from the hydrated nickel oxide to the TiO$_2$ layer. This transfer proceeds because of the presence of photogenerated holes in the valence band (or hole-occupied surface states) of the TiO$_2$, which is thereby poised at a potential more positive than that of the Ni$^{2+}$/Ni$^{3+}$ redox couple.

This fundamental process is the result of bending of the energy bands, i.e. creation of a space-charge region, in the n-type semiconductor TiO$_2$. The holes created by illumination are forced to move toward the semiconductor surface because of the field induced by the space charge. Oxidation of the Ni(OH)$_2$ to NiOOH leads to the coloration of the electrochromic film from nearly transparent to gray or even black, depending on the light intensity and exposure time. The electrons injected into the conduction band can diffuse toward the bulk region of the TiO$_2$ film, recombine with the holes, and/or participate in another redox process. The excess of electrons in the semiconductor is reflected in the remarkable negative shift of the rest potential of the electrode by 0.5–0.6 V. This shift leads to the partial reduction of TiO$_2$, which may be expressed as:

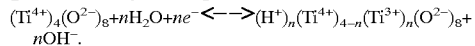

The system responds to illumination in two different ways, depending on which side of the laminated system is exposed to light. When light at an energy equal to or above the bandgap energy of the semiconductive layer passes through the translucent panel from the side of the semiconductor layer, the photochromic effect described above leads to the panel darkening to the extent determined only by the light intensity and exposure time. This effect is less pronounced in the case wherein the light source illuminates the panel from the side of the electrochromic layer. Charge-carrier generation in the semiconductor causes coloration of the electrochromic layer, which then absorbs some part of the incident light. This absorption decreases the efficiency of the charge-carrier generation in the semiconductive layer, and thereby decreases the extent of the electrochromic layer coloration. (A single film of mixed materials will not exhibit this anisotropy.) When the light is blocked, an opposite process takes place. An excess of electrons in the conduction band is spontaneously transferred directly or through surface states into the electrochromic material layer reducing NiOOH to Ni(OH)$_2$. The electrochromic film changes its color from gray back to transparent. The decoloration process occurs somewhat more slowly than the coloration process, possibly due to the insulating properties of Ni(OH)$_2$, which inhibit electron transfer from the TiO$_2$ to unreduced parts of the electrochromic material.

Redox reactions in the electrochromic layer are accompanied by ion intercalation and expulsion in order to maintain a charge balance in the layer. Therefore, an electrolyte suitable for chemically interacting with the electrochromic film must be in contact with the electrochromic film. An electrolyte consisting of a 1 M NaOH solution in water has been found to provide good results. The electrolyte may be contained within a cavity in contact with the electrochromic film and a translucent back panel, or may be partially immobilized by encasing it within a polymer or other porous structure. Only a very thin layer of electrolyte is necessary to provide the desired ion source to drive the electrochromic material.

IV. Alternative Configurations

Additional flexibility of the photoelectrochromic device characteristics is achieved by adopting alternative configurations of the present invention, as shown in FIGS. 1B–D which were briefly described above. Thus, in addition to the basic device fabricated as TiO$_2$/Ni(OH)$_2$/electrolyte layers with no wires or conductors, there is a device fabricated as conductor/ TiO$_2$/Ni(OH)/electrolyte/conductor layers with an external wire connected to an "override" power source. This configuration includes a translucent semiconductor electrode with an electrochromic solid formed in a thin film on one surface of the semiconductor, an electrolyte suitable for interacting with the electrochromic solid, a counterelectrode in contact with the electrolyte, and a switched biasing circuit to selectively provide a bias voltage between the photoelectrode and the counter-electrode (FIG. 1B). Switching between the semiconductor electrode and the counter electrode is provided to selectively bias the semiconductor electrode to a positive, negative or open-circuit state relative to the counter-electrode.

Under positive bias, minority charge carriers (holes) are generated in the space charge region of the n-type TiO$_2$ semiconductor when light at an energy level at or above the band gap of the semiconductive layer strikes the semiconductor electrode. These minority charge carriers flow into the electrochromic film and drive the electrochromic reaction. The electrons from the conduction band are collected by a positively charged conductive sublayer (SnO$_2$) and flow toward the counter electrode through the external circuit. The ions move from the electrochromic film to the counter-electrode to complete the circuit. A slight positive bias of a few hundreds of mV substantially enhances the efficiency and rate of the photoelectrochromic process. Coloration of the electrochromic material occurs almost instantaneously, and it can be preserved for long periods.

When the n-type semiconductor electrode is biased slightly positive, the electrochromic reaction does not occur in the absence of light-generated charge carriers. However, at a high positive bias in the range of volts, depending on the design of the device, electrochemical oxidation of the electrochromic layer occurs through the micropores in the semiconductor layer and a direct electron transfer from the conducting SnO$_2$ sublayer to the electrochromic material takes place. This creates an additional mode of device control, which is usually employed in classical electrochromic devices wherein the coloration/discoloration processes can be achieved electrochemically without participation of light. In such a case, the coloration of the electrochromic film occurs over the entire surface of the electrode and its intensity depends on the amount of charge passed.

In order to drive an n-type device back to its bleached state, a negative bias is required for either an electrochemically or a photoelectrochemically oxidized electrode.

In the negative bias state, the majority charge carriers (electrons) are driven through the electrochromic film and drive the electrochromic reaction in an opposite direction without requiring light. This pure electrochemical process will reduce the black NiOOH into transparent Ni(OH)$_2$. The magnitude of the negative bias should be about a few hundreds of mV but can be varied according to the desires of the user and the particular design of the panel.

The presence or absence of the light under negative electrode bias does not have an effect on the optical state of the electrochromic film, which will remain in its bleached form as long as the negative bias is maintained. The rate of the discoloration process under negative bias is very high and usually bleaching is completed within a few seconds. This time can be reduced further by decreasing the amount of the electrochromic material in the device or by developing the interface surface between the semiconductor (TiO$_2$) and the electrochromic material, i.e. hydrated nickel oxide.

The two-electrode configuration under open-circuit conditions has the same photoelectrochromic properties as the single-electrode device described previously, i.e. it changes color spontaneously under illumination and returns to its bleached state when the illumination is blocked. Electrode biasing not only enhances the rate of the coloration/discoloration process, but also can electrochemically override the photochemical oxidation of the electrochromic material.

Photoelectrochromism observed in the present experimental conditions and the mechanism of the photoelectrochromic reaction in the $TiO_2/Ni(OH)_2$ electrode may be explained as follows. Illumination of the composite electrode $TiO_2/Ni(OH)_2$ leads to a generation of electron hole pairs in the conduction and valence band respectively of the $TiO_2$.

$$TiO_2 + h\nu \rightarrow h^+ + e^-$$

The holes from photogenerated electron-hole-pairs are forced to move toward the surface because of a space charge induced field. A direct electron transfer from the hydrated nickel oxide to the $TiO_2$ layer proceeds because of the presence of photogenerated holes in the valence band (or hole occupied surface states) of the $TiO_2$, which is at a potential more positive than that of the $Ni^{2+}/Ni^{3+}$ redox couple:

$$Ni(OH)_2 + h^+ \rightarrow NiOOH + H^+.$$

Oxidation of the $Ni(OH)_2$ to $NiOOH$ leads to the darkening of the electrochromic film. The photogenerated electrons injected into the conduction band can diffuse toward the bulk region of the $TiO_2$ film, and recombine with the holes, trapped in the surface reduction of $TiO_2$, or reduce another material in the system, e.g. $WO_3$. The formation of stable $Ti^{3+}$ sites may contribute to the coloration of the electrode upon illumination. Importantly, the presence of trapped $Ti^{3+}$ species decreases the efficiency of further photoinduced charge separation in $TiO_2$, thus decreasing the efficiency of the photochromic process.

When the light is blocked, an opposite process takes place. An excess of electrons in the conduction band, thus created, makes them available for direct interfacial charge transfer or through the surface states into the electrochromic material layer, reducing $NiOOH$ to $Ni(OH)_2$. The electrochromic film changes its appearance (bleaches) back to transparent.

V. Photovoltaic Properties

Figure 1E:
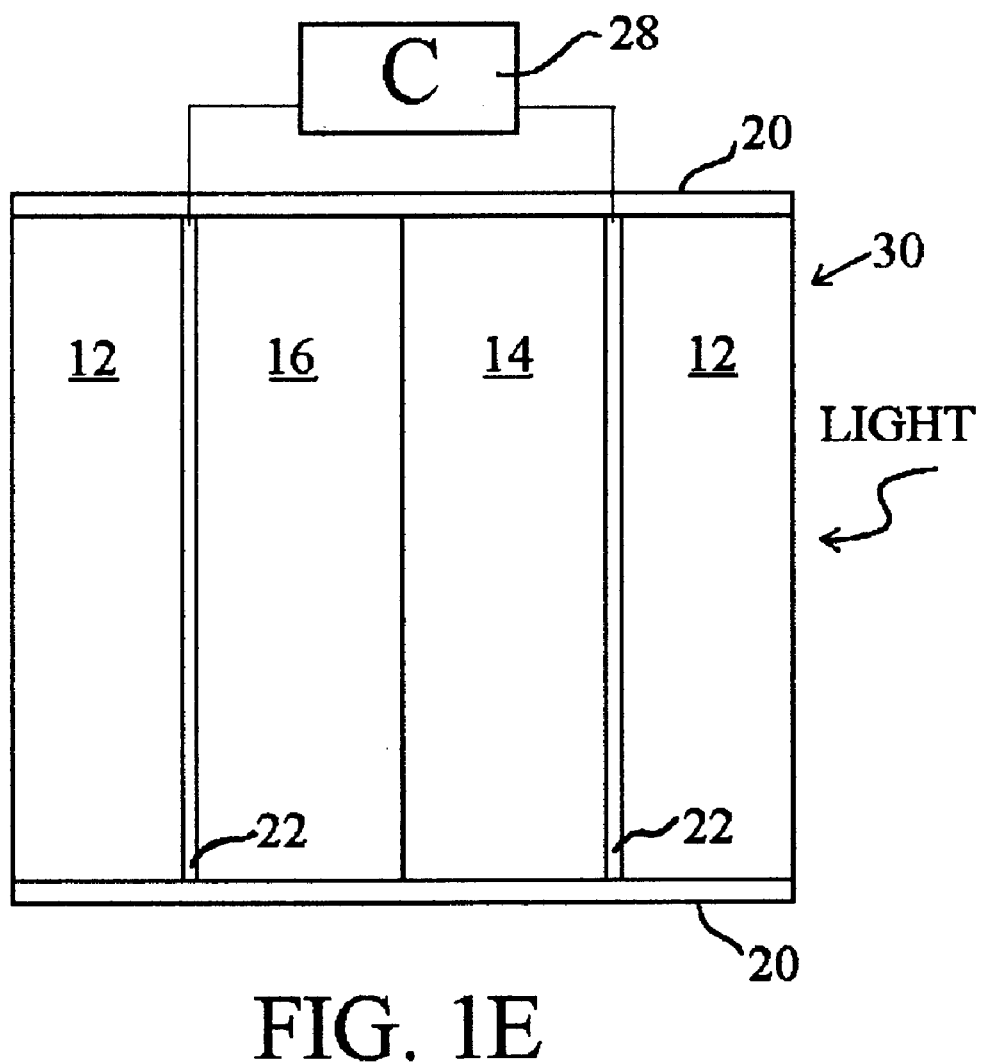

The photoactive-electrochromic $TiO_2$—$Ni(OH)_2$ materials can be used to form a photovoltaic device for the conversion of light (preferably in the visible spectrum) to electrical current (or voltage). A photovoltaic device 30, shown in FIG. 1E, is formed of two electrodes, one of each material, sandwiched together to form direct contact. A pair of substrates 12 with conductive layers 22 surround the $TiO_2$—$Ni(OH)_2$ layers 14, 16. A separate electrolyte layer is not included but layers 14, 16 are immersed in electrolyte. An enclosure 20 surrounds the assembly. An external electrical circuit (C) 28 is connected to conductive layers 22 to drawn current from the device so that the coloration reaction does not occur. Thus the device functions as a photovoltaic cell to generate electricity. The layers are thin and at least one is transparent to the light. A prototype delivered 50 $\mu A/cm^2$ at 0.5 V potential when illuminated by UV light from a Xe lamp.

VI. Utility of the Photoelectrochromic Device

The photoelectrochromic device of the present invention is suitable for a number of architectural, vehicle and aerospace glazing applications. The use of a low-cost color changing device which does not require an external power source to change the transmittance but instead uses the energy of the incident sunlight to modify its own transmissivity will, for example, significantly decrease air-conditioning costs in commercial buildings. Moreover, thermoinsulating windows formed of these devices could be easily installed in existing buildings without requiring additional electrical considerations.

The neutral gray to deep black color of the colored device is also suitable for large-surface-area architectural glazing from the aesthetic point of view. Self-driven photoelectrochromic windows applied in vehicles will also save on air-conditioning demands, which results in lower fuel consumption, reduced emissions of combustion gases, and consequently a cleaner environment. Benefits arising from the application of the self-powered windows in aerospace technologies cannot be overestimated. Energy-efficient technologies are very important in the design and construction of the air and/or space transportation technologies wherein the amount of energy to be produced and stored to drive equipment determines the performance parameters of the entire system.

The devices of the invention also provide a basis for photoelectrochromic ophthalmic lenses leading to development of a new class of sunglasses, and to tunable photochromic neutral density filters, modulators and shutters. If one side of the panel is coated by a reflecting layer, e.g. a silver coating, a photosensitive mirror is obtained, which may also be applied in architectural and vehicle glazing to be used as mirrors for vehicles.

Additionally, the present invention can also be applied in a device for creating a photoelectrochromic display. The potential user of such a display may write on the panel using a light pen or other light source. The image made by the user remains on the panel for some time in the one-electrode configuration or it will last almost indefinitely under positive bias in the two-electrode configuration, until the user changes the electrical bias of the panel to a negative state, thereby erasing the image. A device to measure surface area could be developed on the basis that the panel has a well-defined spatial resolution, i.e. the unexposed part remains transparent whereas the illuminated part becomes colored. The charge consumed to erase the image will be proportional to the exposed area, which allows the quantitative determination of the area of the covered part of the panel. If an array of photochromic electrodes is arranged in a matrix with an array of counterelectrodes and all are controlled by an electronic or computer switching system, an addressable display panel could be constructed. In this arrangement, the image can be read and stored in digital form, and moreover the amount of charge stored in each "pixel" will carry information about the pixel intensity.

This invention is also suitable for development of a new class of light detectors, optical switches and light-intensity meters. Devices produced on the basis of semiconductors with large bandgaps (>3 eV) may be used to detect invisible, near-UV radiation and fabricate inexpensive UV monitoring devices, UV light beam detectors, etc.

Also, the present invention may find application as a low cost optical computer memory device. The coloration/bleaching represents "zeros" and "ones," and can form the basis for large-scale memory arrays, the dimensions of which are limited in principle by the wavelength of light.

These and other similar utilities are intended to be within the scope of this invention.

EXAMPLE 1

Preparation of Microporous Nanocrystalline $TiO_2$ Films

Microporous nanocrystalline $TiO_2$ films were prepared on 25×38 mm piece of conducting glass ($SnO_2$ coated glass), according to the procedure described in *Thin Solid Films,* 283:188 (1996). The coating solution consisted of Ti(OC$_3$H$_7^i$)$_4$ dissolved in ethanol mixed with isopropyl alcohol and hydrochloric acid. Titanium isopropoxide, anhydrous ethanol, isopropyl alcohol, hydrochloric acid and distilled water were mixed in molar ratios 1:53:3:0.15:1 or in other ratios described in the reference. The equivalent oxide content of TiO$_2$ in these solutions was kept constant at 10.8% by weight. A detailed description of solution composition and preparation can be found in *Thin Solid Films,* 219:18 (1992) and 283:188 (1996). The glass substrate was dipped once in the solution and then dried out in air at ambient conditions for 1 hour. Then, the coating film was heat-treated at 773 K in N$_2$ atmosphere for 1 hour.

EXAMPLE 2

Electrode Coating with Films

Nickel hydroxide films were deposited by galvanostatic cathodic precipitation onto freshly prepared Ti/TiO$_2$ or polycrystalline Ni electrodes from an aqueous solution of 0.01M Ni(NO$_3$)$_2$ as described in *J. Electrochem. Soc.,* 144:485 (1997). The films were deposited at −14.3 mA/cm$^2$ for 20 seconds which corresponds to 286 mC/cm$^2$ resulting in films which are 1–1.4 μm thick. The electrodes were rinsed thoroughly with distilled water and dried in ambient conditions for 4 hours.

Example 1 and 2 illustrate particular methods to form the layers of TiO$_2$ and Ni(OH)$_2$ to form a photoelectrochromic device according to the invention. Example 3 illustrates another method.

EXAMPLE 3

Fabrication of the Photochromic Device

Microporous nanocrystalline TiO$_2$ films were prepared on a 0.28 cm$^2$ cross-section of 99.8% pure Ti rod, and on a transparent glass plate made electronically conducting by applying a thin layer of SnO$_2$. The rod was polished with successively finer emery papers and 1 μm diamond paste, and then pickled in boiling 20 wt % aqueous HCl for 20 minutes. The glass plate was cleaned with ethanol prior to TiO$_2$ deposition. One gram of TiO$_2$ (anatase form) was suspended in 10 cm$^3$ solution of dimethylformamide and 0.25 g of poly(vinylidenefluoride), and the resulting suspension was sprayed onto the cross-section of the Ti rod and the surface of the conducting glass. The electrodes and glass were dried in air for 1 hour at ambient temperature and then for 1 hour at 100° C. The electrodes were finally annealed for 1 hour at 450° C. The estimated TiO$_2$ film thickness was 600 nm.

Nickel hydroxide films were deposited by galvanostatic cathodic precipitation onto freshly prepared Ti/TiO$_2$ or glass/SnO$_2$/TiO$_2$ substrates from an aqueous solution of 0.01 M Ni(NO$_3$)$_2$. The films were deposited at about −0.15 mA/cm$^2$ until a charge of 200 mC/cm$^2$ was passed. The estimated Ni(OH)$_2$ film thickness was 1200 nm.

Changes and modifications in the specifically described embodiments can be carried out without departing from the scope of the invention which is intended to be limited only by the scope of the appended claims.

What is claimed is:

1. A photoelectrochromic device of changeable transmissivity, said device not requiring an external electrical source to change transmissivity, said device comprising a two-component system wherein one component comprises a photoactive charge carrier generating material and the other component comprises an electrochromic material which undergoes a color changing redox reaction by direct charge transfer with photogenerated charge carriers from the charge carrier generating material.

2. The device of claim 1 wherein the electrochromic material is hydrated nickel oxide and the charge carrier generating material is titanium dioxide.

3. The device of claim 1 wherein the two components are formed as layers.

4. The device of claim 1 wherein the two components are mixed together.

5. The device of claim 1 further comprising an electrolyte in contact with the electrochromic material.

6. The device of claim 5 further comprising a pair of substrates, at least one of which is transparent, surrounding the charge carrier generating material, electrochromic material, and electrolyte.

7. The device of claim 6 wherein the substrates are nonconducting.

8. The device of claim 6 wherein the substrates are conducting, and further comprising an external electrical power source connected to the conducting substrates to apply a bias voltage sufficient to enhance the color changing redox reaction of the electrochromic material.

9. The device of claim 8 wherein the power source is switchable between positive bias, negative bias, and open circuit states.

10. The device of claim 2 wherein the two components are formed as adjacent layers.

11. The device of claim 10 further comprising a pair of substrates, at least one of which is transparent, surrounding the adjacent layers.

12. The device of claim 11 wherein the substrates are conducting, and further comprising an external electrical circuit connected to the conducting substrates to remove photogenerated electrical current from the device to form a photovoltaic device.

* * * * *